United States Patent [19]
Learmont

[11] 3,860,289
[45] Jan. 14, 1975

[54] PROCESS FOR LEACHING MINERAL VALUES FROM UNDERGROUND FORMATIONS IN SITU

[75] Inventor: Robert P. Learmont, Warba, Minn.

[73] Assignee: United States Steel Corporation, Pittsburgh, Pa.

[22] Filed: Oct. 26, 1972

[21] Appl. No.: 300,956

[52] U.S. Cl. ................................................. 299/4
[51] Int. Cl. ........................................... E21b 43/28
[58] Field of Search ...................................... 299/4, 5

[56] References Cited
UNITED STATES PATENTS
3,708,206   1/1973   Hard et al. ............................. 299/5

Primary Examiner—Ernest R. Purser

[57] ABSTRACT

A process for leaching mineral values from an underground formation in situ, applicable particularly to uranium. In accordance with known practice, an aqueous solution of a leaching agent (alkaline or acid) is delivered into the formation, where it remains for a prolonged period, and then is pumped out with dissolved mineral values. Some minerals occur naturally in a relatively insoluble form, and can be leached only if first oxidized to a more soluble form. An example is uranium oxide, which occurs naturally in the plus-four valance state ($UO_2$) and must be oxidized to the plus-six valance state ($UO_3$) to enable it to be leached. Invention is to introduce oxygen to the leaching solution at a substantial depth within the injection well where the head of solution thereabove increases the solubility of oxygen in the solution.

2 Claims, 1 Drawing Figure

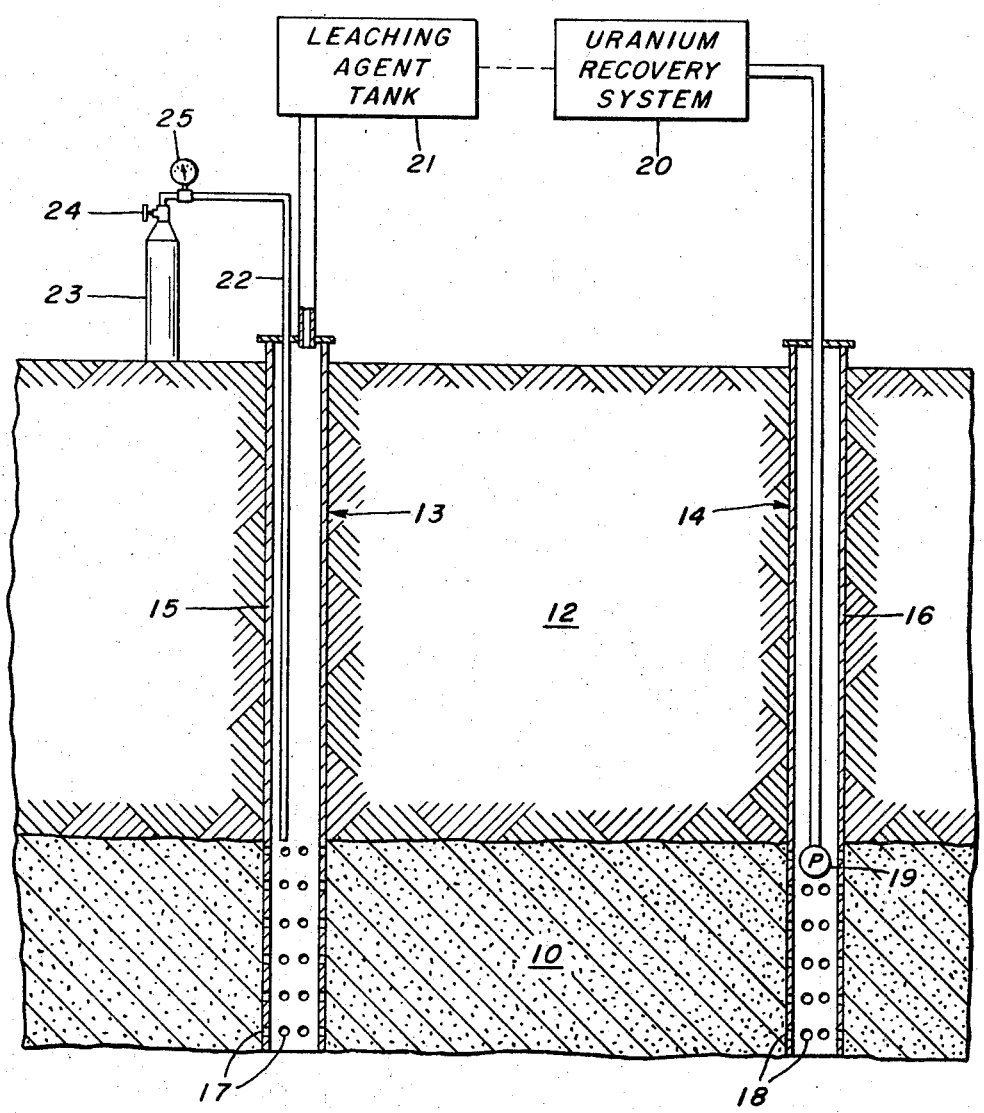

PROCESS FOR LEACHING MINERAL VALUES FROM UNDERGROUND FORMATIONS IN SITU

This invention relates to an improved process for leaching mineral values from an underground formation in situ.

Although my invention is not thus limited, the process is particularly useful for leaching uranium values. To simplify the ensuing description, I describe the invention as applied to a uranium-leaching process. Nevertheless it is apparent the invention is applicable to leaching other mineral values where similar problems are encountered.

In known processes for leaching uranium values from underground formations in situ, an oxygenated aqueous solution of a leaching agent (alkaline or acid) is delivered to the uranium-bearing formation through one or more injection wells. The solution remains in contact with the formation for a prolonged period, during which uranium values dissolve therein. Subsequently the pregnant solution is pumped from the ground through one or more production wells, and the uranium values recovered by known procedures, for example an ion exchange process. Acid leaching agents can be used in some formations, but only alkaline leaching agents can be used where the formation contains significant quantities of acid-consuming gangue, or where there is a pollution problem. Any water-soluble carbonate or bicarbonate may be a suitable alkaline leaching agent, except that the choice is restricted in formations which have constituents adversely affected by certain carbonates. For example, $Na_2CO_3$ causes montmorillonite clay to swell and plug any formation in which it is present in significant quantities. Excessive quantities of other alkaline agents may likewise lead to plugging. The limits of carbonate content are about 200 to 5,000 ppm. Reference can be made to Menke U.S. Pat. No. 2,896,930 for a description of a previous in situ leaching process in which an alkaline agent is used.

The process of oxygenating the leaching solution is to convert uranium values to a state more soluble in the solution than the state in which the values occur naturally. Uranium values usually occur naturally as an oxide in the relatively insoluble plus-four valance state, $UO_2$. An oxidizing agent is needed in the solution to convert these values to the more soluble plus-six valance state, $UO_3$. The Menke patent discloses that hydrogen peroxide may be introduced to the leaching solution to furnish the oxidizing agent. Hydrogen peroxide is costly and difficult to handle, and its presence may diminish the permeability of the formation. A known alternative is to aerate the solution at the surface, whereby it picks up atmospheric oxygen, before it is injected into the injection wells. I have found that the concentration of oxygen obtained by aeration is undesirably low.

An object of my invention is to provide an in-situ leaching process, applicable generally to minerals which require oxidation to be leached and to both alkaline and acid leaching solutions, wherein I employ an improved method of oxygenating the solution and obtain a much higher oxygen concentration than is obtained through aeration at the surface.

A more specific object is to provide a leaching process for uranium or other mineral values in which I introduce oxygen to the leaching solution by "downhole" injection; that is, I introduce oxygen to the leaching solution at a depth within an injection well where the solution is under the pressure of a substantial head thereabove.

In the drawing:

The single FIGURE is a diagrammatic vertical sectional view of a leaching operation in which my invention is practiced.

The drawing shows a vertical sectional view of an underground mineral-bearing formation 10, and an overburden 12. For purposes of illustration, the mineral value is taken to be uranium oxide in the plus-four valance state, which commonly is present to an extent of no more than about 10 pounds per ton, conventionally reported as $U_3O_8$. The gangue with which the uranium values are associated may be of various materials, but commonly is clay, limestone, or sand or a mixture thereof. One or more injection wells 13 and one or more production wells 14 are drilled into the formation 10 in accordance with a predetermined pattern to furnish efficient leaching. The injection and production wells have casings 15 and 16 respectively, the exteriors of which may be sealed from the surrounding overburden 12. The lower portions of the casings 15 and 16 have perforations 17 and 18 respectively communicating with the formation 10.

In accordance with known practice, a leaching solution is injected down the casing 15 of the injection well 13, either by gravity or pumping, and is delivered to the formation 10 through the perforations 17. The solution percolates through the formation and dissolves uranium values. Eventually the pregnant solution reaches the production well 14, where it enters the casing 16 through perforations 18. The production well is equipped with any suitable conventional subsurface pump 19, which brings the pregnant solution to the surface. The solution goes to a conventional uranium recovery system 20, where the uranium values are separated. The barren solution devoid of uranium values may be discarded, but preferably goes to a tank 21, where make-up leaching agent is added, and then is recirculated. In most instances there is sufficient ground water to supply the additional water needed for the leaching solution.

In accordance with my invention, I introduce oxygen, preferably in commercially pure form, to the leaching solution via a conduit 22 which extends down the casing 15 of the injection well. Conveniently the conduit 22 may be a rubber hose. At the surface, I connect conduit 22 to a source of oxygen under pressure, herein illustrated as an oxygen gas cylinder 23 equipped with a conventional reducing valve 24 and flowmeter 26. At the depth at which the oxygen enters the leaching solution, the solution of course is under the pressure of the head of solution in the casing thereabove.

The term "submergence" as used hereinafter refers to the vertical distance measured from the surface of the column of solution in the casing 15 to the location at which oxygen enters the solution in the casing. The solubility of oxygen in the solution varies with the submergence, which according to my invention should be at least 15 feet, but may extend to any distance from the 15-foot level to the full depth of the injection well. A submergence of 100 to 300 feet is a practical range. To obtain an oxygen concentration of at least 100 ppm, which is desirable, I need minimum submergence of at least 100 feet, which varies with conditions such as solution temperature and composition. The oxygen pressure needs to be sufficient to overcome the solution head at the depth of submergence. By contrast the maximum oxygen concentration obtained by aeration at the surface is only about 8 to 12 ppm.

Following is a specific example which serves to demonstrate how my invention operates:

The mineral-bearing formation contained about 6 pounds per ton of uranium oxide expressed as $U_3O_8$, but in the plus-four valance state. The gangue consisted of a mixture of montmorillonite clay, limestone and sand. An overburden about 500 feet deep covered this formation. The natural ground water contained bicarbonate ions in a concentration of about 400 ppm, expressed as equivalent $NaHCO_3$. Four injection wells were located at the corners of a square fifty feet on a side, and a single production well was located at the center of the square ("five-spot" pattern). Since this formation contained a significant quantity of acid-consuming limestone, the uranium values could be leached therefrom only with an alkaline solution.

I started a leaching operation using oxygenated natural ground water as the leaching solution, which I injected at a rate of 12 gallons per minute at each injection well. I routed the pregnant solution pumped from the production well to an ion exchange uranium recovery system, and recirculated the barren solution therefrom. After eight days operation, uranium commenced to appear in the solution pumped from the production well. As uranium values were leached from the formation, bicarbonate was consumed. I added sufficient ammonium bicarbonate to the barren solution to maintain a bicarbonate concentration approximately equal to that of the natural ground water. When oxygen was introduced to the solution only by aeration, the $U_3O_8$ content of the pregnant solution pumped from the production well was only about 20 to 40 ppm. By changing to my down-hole injection of oxygen at a submergence of 150 feet, I immediately obtained a threefold increase in the $U_3O_8$ content of the pregnant solution.

A similar procedure can be followed in an acid leach, using a dilute solution of various acids (for example $H_2SO_4$) as a leaching agent. The down-hole injection of oxygen furnishes the oxidizing agent needed to convert uranium values to a form soluble in the leaching solution irrespective of what particular leaching agent is used. Similar principles apply also to minerals other than uranium when the mineral must be oxidized to convert it to a soluble form. In any case the additional oxygen concentration obtained in the leaching solution through practice of my invention significantly increases the content of mineral values in the pregnant solution.

I claim:

1. In a process for leaching mineral values from an underground formation in situ in which an oxygenated aqueous solution of a leaching agent is delivered to the formation through an injection well, the solution remains in contact with the formation for a prolonged period, and the pregnant solution with mineral values dissolved therein is pumped from the formation for recovery of said values, an improved method of xoygenating oxygenating solution, said method comprising introducing oxygen from a source at the surface down said injection well at a submergence of 100 to 300 feet, where it enters the solution under a pressure of the head of solution thereabove.

2. A method as defined in claim 1 in which the oxygen is in commercially pure form.

* * * * *